(12) United States Patent
Staerzl

(10) Patent No.: US 7,355,518 B1
(45) Date of Patent: Apr. 8, 2008

(54) CORDLESS LANYARD SYSTEM USING E-FIELD

(75) Inventor: Richard E. Staerzl, Fond du Lac, WI (US)

(73) Assignee: Brunswick Corporation, Lake Forest, IL (US)

(*) Notice: Subject to any disclaimer, the term of this patent is extended or adjusted under 35 U.S.C. 154(b) by 139 days.

(21) Appl. No.: 11/377,964

(22) Filed: Mar. 17, 2006

(51) Int. Cl.
  *G08B 23/00* (2006.01)
(52) U.S. Cl. .................... 340/573.1; 340/984
(58) Field of Classification Search ............ 340/573.1, 340/870.28, 870.29, 984, 457, 457.1
See application file for complete search history.

(56) References Cited

U.S. PATENT DOCUMENTS

| | | | | |
|---|---|---|---|---|
| 5,019,804 A | | 5/1991 | Fraden | 340/562 |
| 5,171,063 A | * | 12/1992 | Stidd | 297/344.1 |
| 5,871,232 A | * | 2/1999 | White | 280/735 |
| 5,936,412 A | | 8/1999 | Gershenfeld et al. | 324/663 |
| 6,329,913 B1 | | 12/2001 | Shieh et al. | 340/561 |
| 6,450,845 B1 | * | 9/2002 | Snyder et al. | 440/1 |
| 6,509,747 B2 | | 1/2003 | Nagai et al. | 324/687 |
| 6,661,115 B2 | | 12/2003 | Lester | 307/10.1 |
| 6,825,765 B2 | | 11/2004 | Stanley et al. | 340/561 |
| 7,009,502 B2 | * | 3/2006 | Breed et al. | 340/436 |
| 7,081,028 B1 | * | 7/2006 | Crane | 440/84 |
| 7,243,945 B2 | * | 7/2007 | Breed et al. | 280/735 |

FOREIGN PATENT DOCUMENTS

| | | |
|---|---|---|
| GB | 2286247 | 1/1995 |
| WO | WO 97/35738 | 3/1997 |

OTHER PUBLICATIONS

Eady, Fred. (Jun. 2003, Issue 155). E-Field Evaluation Module. Circuit Cellar. Retrieved Jan. 20, 2006, from http://www.circuitcellar.com/11brary/print/0603/eady155/index.htm.
Motorola E-Field Sensor Contest. (n.d.). Retrieved Feb. 24, 2006, from http://www.jandspromotions.com/efield2003/.

* cited by examiner

*Primary Examiner*—Daryl C Pope
(74) *Attorney, Agent, or Firm*—William D. Lanyi

(57) ABSTRACT

A monitoring system detects the presence or absence of a marine vessel operator within a defined zone near the helm of a marine vessel. The detection is accomplished through the use of a provision of an e-field and the detection of e-field strength by a receiving antenna system. When the operator is in the proper helm position, the e-field strength is diminished by the presence of a portion of the operator's body within the e-field zone.

19 Claims, 6 Drawing Sheets

CORDLESS LANYARD SYSTEM USING E-FIELD

BACKGROUND OF THE INVENTION

1. Field of the Invention

The present invention is generally related to a cordless lanyard system and, more particularly, to a cordless lanyard system that generates and senses an e-field magnitude to determine whether or not an operator of a marine vessel is in a proper position relative to the helm station of the vessel.

2. Description of the Related Art

Various devices and procedures have been developed to assure that an operator of a marine vessel is in a proper position at the helm of the vessel. These systems vary from simple cords attached between the operator and a switch to turn off a marine engine when the operator leaves the helm station and more complex systems that use infrared technology to sense the presence of the operator at the helm station. Various devices, using e-field technology, have been developed to sense the presence of an object within certain specified detection zones.

United Kingdom Patent Application GB 2286247, which was filed by Gershenfeld on Jan. 24, 1995, describes a capacitive position detection system. A sensor for monitoring a characteristic of an object, for example, its position is described. The sensor includes an electrode pair and a signal generator connected to pass a displacement current between the electrodes. Changes in the position or other monitored characteristic of the sensed object modify the displacement current and sensing of that current thus provides an electrical indication of the sensed changes. A multiple electrode pair system can be used to monitor the position of an object with improved accuracy by sensing the displacement currents between multiple pairs of electrodes.

International Application Publication Number WO 97/35738, which was filed by Kithil et al. on Mar. 7, 1997, describes a motor vehicle occupant sensing system. A roof-mounted passenger position sensor array of capacitive coupling passenger position sensors is provided to determine position and motion of a passenger by analysis of distances of the passenger to the various sensors of the array and analysis of the changes of the distances with time.

U.S. Pat. No. 5,019,804, which issued to Fraden on May 28, 1991, describes an apparatus and method for detecting movement of an object. A sensor electrode is capacitively coupled to the environment. Electric charges carried by surrounding objects induce corresponding electric charges on the sensor electrode. A high input impedance circuit senses changes in charge on the electrode and provides a first varying signal indicative of that change. A second circuit compares the first signal against a threshold level and provides a second signal indicative of the movement.

U.S. Pat. No. 5,936,412, which issued to Gershenfeld et al. on Aug. 10, 1999, describes a method for resolving presence, orientation and activity in a defined space. It utilizes at least two electrodes proximate to the space to be observed. A characterization of the position and orientation is obtained by providing a pattern of measurement clusters each associated with a position and an orientation. An AC signal is applied to one electrode and the current measured from the electrode to any other electrodes included in the system and which are effectively connected to the ground return of the AC-coupled electrode. A person to be sensed intercepts a part of the electric field extending between the AC-coupled sending electrode and the other receiving electrodes, the amount of the field intercepted depending on the size and orientation of the sensed person.

U.S. Pat. No. 6,329,913, which issued to Shieh et al. on Dec. 11, 2001, describes a passenger detection system and method. The system utilizes an oscillation circuit that causes an antenna electrode to emit an electric field that is disrupted by the electrical characteristics of an object placed on the seat. This disruption alters the current and phase of the signal in the antenna electrode. By comparing the current flowing in the antenna electrode and/or the difference between the phase of the signal in the antenna electrode and the oscillation circuit output signal with predetermined threshold values, it is possible to detect the presence of a passenger in a reliable and inexpensive manner.

U.S. Pat. No. 6,450,845, which issued to Snyder et al. on Sep. 17, 2002, discloses a passive occupant sensing system for a watercraft. A thetherless occupant detector system uses an infrared sensor and a monitor circuit that provides a deactivation signal to an engine control unit or other control mechanisms in the event of an operator of the marine vessel leaving a preselected control position at its helm. The infrared sensor provides an output signal that is generally representative of the heat produced by an occupant within the control position of a marine vessel. The monitor circuit reacts to a sudden decrease in this heat magnitude and provides a deactivation signal in response to detecting this sudden decrease. The deactivation signal provided by the monitor circuit can be received by an engine control unit which then, in turn, deactivates a marine propulsion system. Alternatively, the deactivation signal itself can cause a deactivation of the marine propulsion system.

U.S. Pat. No. 6,509,747, which issued to Nagai et al. on Jan. 21, 2003, describes an apparatus for detecting seated condition. The apparatus detects whether a passenger is seated on a seat and the location of the passenger if seated. In the apparatus for detecting seated condition, antenna electrodes are provided in the inside of the seat so that the electric field generates between the ground and the antenna electrodes. A detecting circuit detects a first output of the electric field in a case that a passenger is not seated and a second output of the electric field in a case that a passenger is seated.

U.S. Pat. No. 6,661,115, which issued to Lester on Dec. 9, 2003, describes a conductive e-field occupant sensing system. The apparatus is intended for sensing size and locations of a vehicle occupant and includes a conductor that is electrically coupled to a voltage signal generator and disposed within the seat of the vehicle. The conductor generates a periodic electric field. A plurality of sensor electrostatic antennas is disposed adjacent the roof and is capable of sensing at least a portion of the electric field. A detection circuit determines the size and location of a vehicle occupant based upon an amount of the electric field incident on each sensor electrostatic antenna.

U.S. Pat. No. 6,825,765, which issued to Stanley et al. on Nov. 30, 2004, describes an occupant detection system. It comprises a weight sensor and an electric field sensor, each operatively coupled to a seat. The electric field sensor generates an electric field from at least one electrode in the seat bottom of the seat, provides for generating a response to an influence of the occupant thereupon, and is adapted to provide for discriminating from the response a seated infant or child seating condition from another seating condition.

The patents described above are hereby expressly incorporated by reference in the description of the present invention.

An article, titled "E-field Evaluation Module" appeared in the June 2003, Issue 155, addition of Circuit Cellar which is available on the Internet. It describes a Motorola product that is adaptable to various sensor systems and uses an e-field to determine the presence of various objects within a defined zone.

A contest, using e-field sensors, is described on the Internet at a website identified as "http://www.jandspromotions.com/efield2003/. One of the entries in the Motorola e-field sensor contests describes an electronic whoopie cushion deux that uses an e-field sensor. The system reacts to a person sitting on a flat device places on or under a cushion of a chair. When a human being is sensed, a sound emanates from the system.

It would be significantly beneficial if an occupant sensing system could be provided for a marine vessel in which the system is not dependent on surrounding the occupant with various sensors above and below the monitored position. It would also be significantly beneficial if the system could monitor the position of the occupant whether the occupant is sitting or standing within the appropriate detection zone. Furthermore, it would be significantly beneficial if an occupant detection system could be provided which is not overly sensitive to moisture and other changes in the environment within which the system is used. It would be further beneficial is such a system could be self-calibrating in nature.

SUMMARY OF THE INVENTION

A method for detecting an occupant in a preselected position at a control position of a marine vessel, in accordance with a preferred embodiment of the present invention, comprises the steps of providing a transmitting antenna system, providing a receiving antenna system, supporting the transmitting and receiving antenna systems at a location proximate a helm of a marine vessel, causing an electric field to be emitted by the transmitting antenna system and received by the receiving antenna system, receiving a first signal which represents the electric field received by the receiving antenna system, comparing the first signal to a threshold magnitude, and determining whether the marine vessel operator is present within the preselected region of the marine vessel as a function of the first signal and the threshold magnitude. The electric field extends in a preselected region where a portion of a body of a marine vessel operator is located during safe operation of the marine vessel by the marine vessel operator.

In a particularly preferred embodiment of the present invention, the method further comprises the steps of providing a reference antenna system and receiving a reference signal which represents the electric field received by the reference antenna system. The determining step in a preferred embodiment of the present invention determines whether the marine vessel operator is present within the preselected region of the marine vessel as a function of the first signal, the reference signal, and the threshold magnitude. The reference antenna system can comprise first and second reference antennae. The present invention, in a preferred embodiment, can further comprise the step of mathematically altering the first signal as a function of the reference signal. The receiving antenna system can comprise first and second receiving antennae.

In one embodiment of the present invention, the transmitting and receiving antenna systems are disposed for support within a housing structure which is attached beneath a seat of a chair that is located at the helm of the marine vessel.

The comparing step can comprise a plurality of sequential comparisons performed at a preselected frequency and the determining step can comprise a plurality of sequential determinations performed at the preselected frequency. A determination that the marine vessel operator is absent from the preselected region of the marine vessel can be made when a predetermined number of the plurality of sequential determinations indicate that the marine vessel operator is not present within the preselected region of the marine vessel. The determining step can comprise a step of detecting a lack of change in a magnitude of the first signal over a preselected period of time. The preselected region can include a portion of the body of the marine vessel operator both when the marine vessel operator is seated at the helm and when the marine vessel operator is standing at the helm. The portion of the body of the marine vessel operator can comprise a leg of the marine vessel operator in a particularly preferred embodiment.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
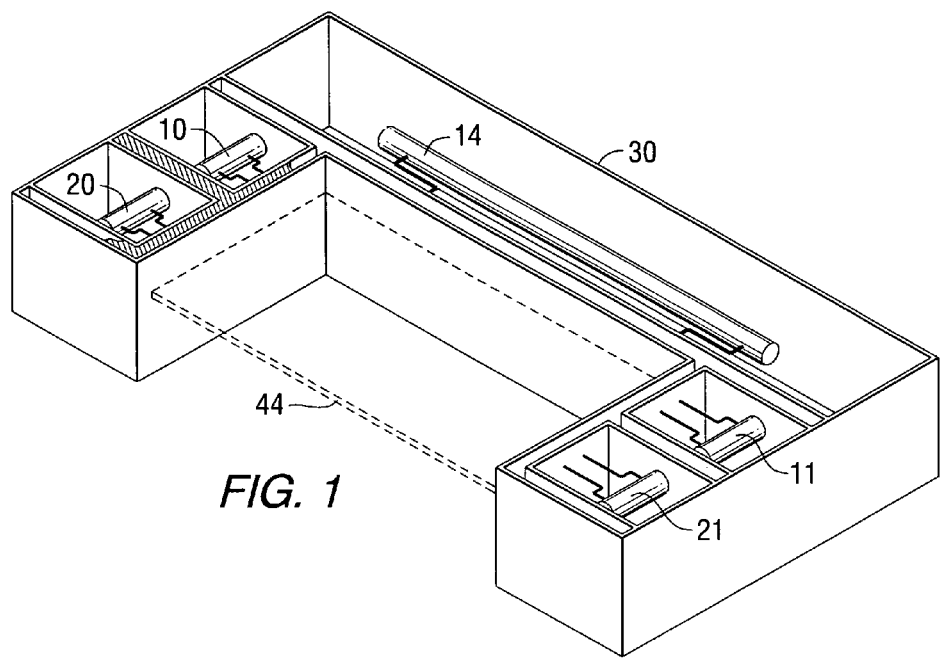
FIGS. 1 and 2 show a support structure with the various antennae used in a preferred embodiment of the present invention.

Throughout the description of the preferred embodiment of the present invention, like components will be identified by like reference numerals.

Figure 2:
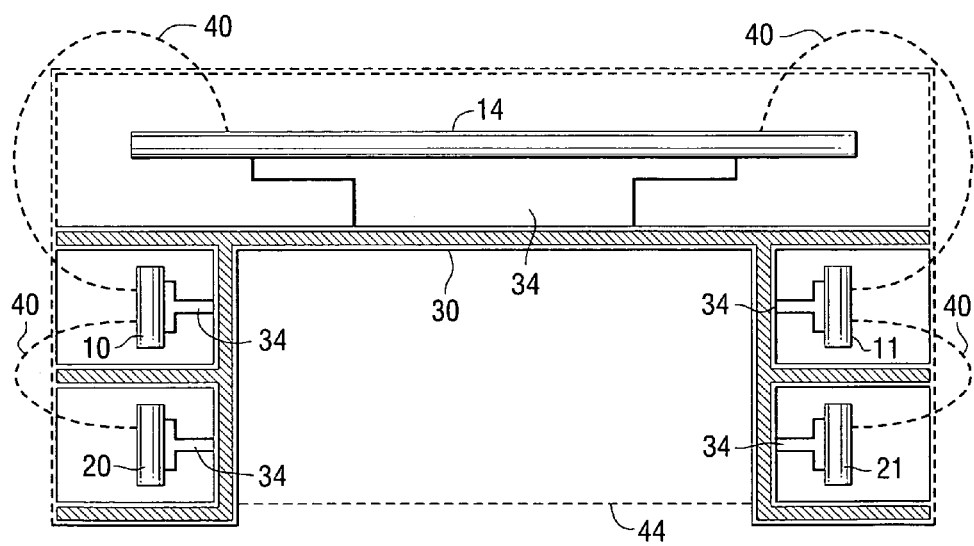

With reference to FIGS. 1 and 2, a particularly preferred embodiment of the present invention provides a transmitting antenna system, 10 and 11, and a receiving antenna system, 14. A preferred embodiment of the present invention further provides a reference antenna system, 20 and 21. In the preferred embodiment of the present invention illustrated in FIGS. 1 and 2, the transmitting and receiving antenna systems and the reference antenna system are disposed for support within a housing structure 30. The housing structure 30 is configured to be attached beneath a seat of a chair which is located at the helm station of a marine vessel.

With continued reference to FIGS. 1 and 2, the antennae are supported by non-conductive structures 34 which are, in turn, attached to the housing structure 30. The housing structure 30 provides compartments in which the various antenna members are supported. Portions of the walls of the support structure 30 are made of a conductive material (cross hatched) in order to inhibit the direct passage of an electric field between the antenna members without having to extend into detection zones that will be described in greater detail below. In FIG. 2, the electrically conductive walls of the support structure 30 are exaggerated in thickness in order to illustrate their electrically conductive nature. The non-electrically conductive walls of the support structure 30 are illustrated by dashed lines in FIG. 2. These non-electrically conductive walls allow the electric field 40 to pass unobstructed between the transmitting antenna system, 10 and 11, and both the receiving antenna system 14 and the reference antenna system, 20 and 21.

With continued reference to FIGS. 1 and 2, it can be seen that the support structure 30 is generally U-shaped. In the central opening of the U-shaped structure, the location of a circuit board 44 is represented by dashed lines. Although not limiting to the present invention, the central opening of the U-shaped structure provides a convenient place to mount the circuit board which contains the various electrical components necessary to operate the present invention.

Figure 3:
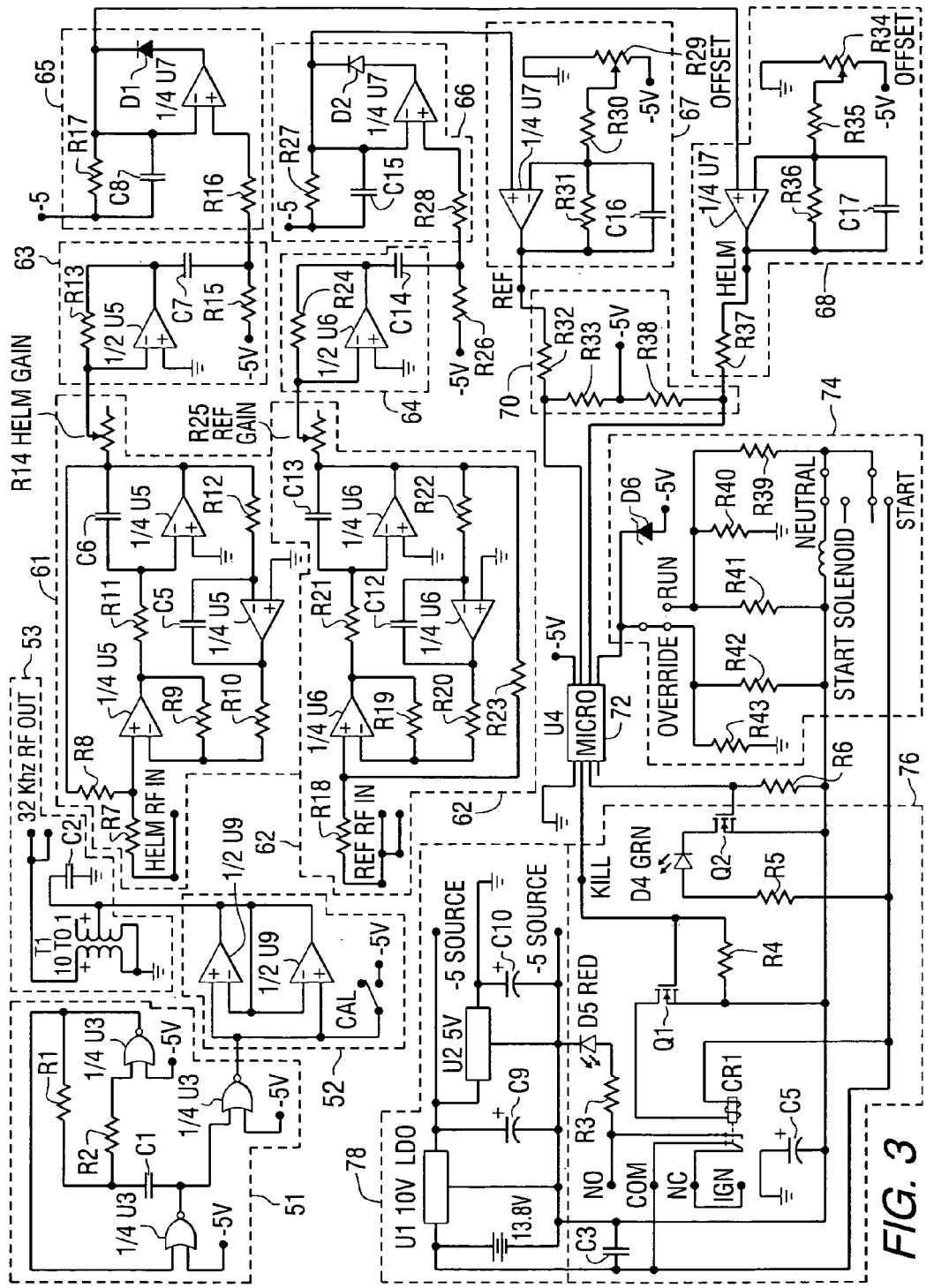
FIGS. 3 and 4 illustrate an electrical circuit used to accomplish the functions of the present invention.
Figure 4:
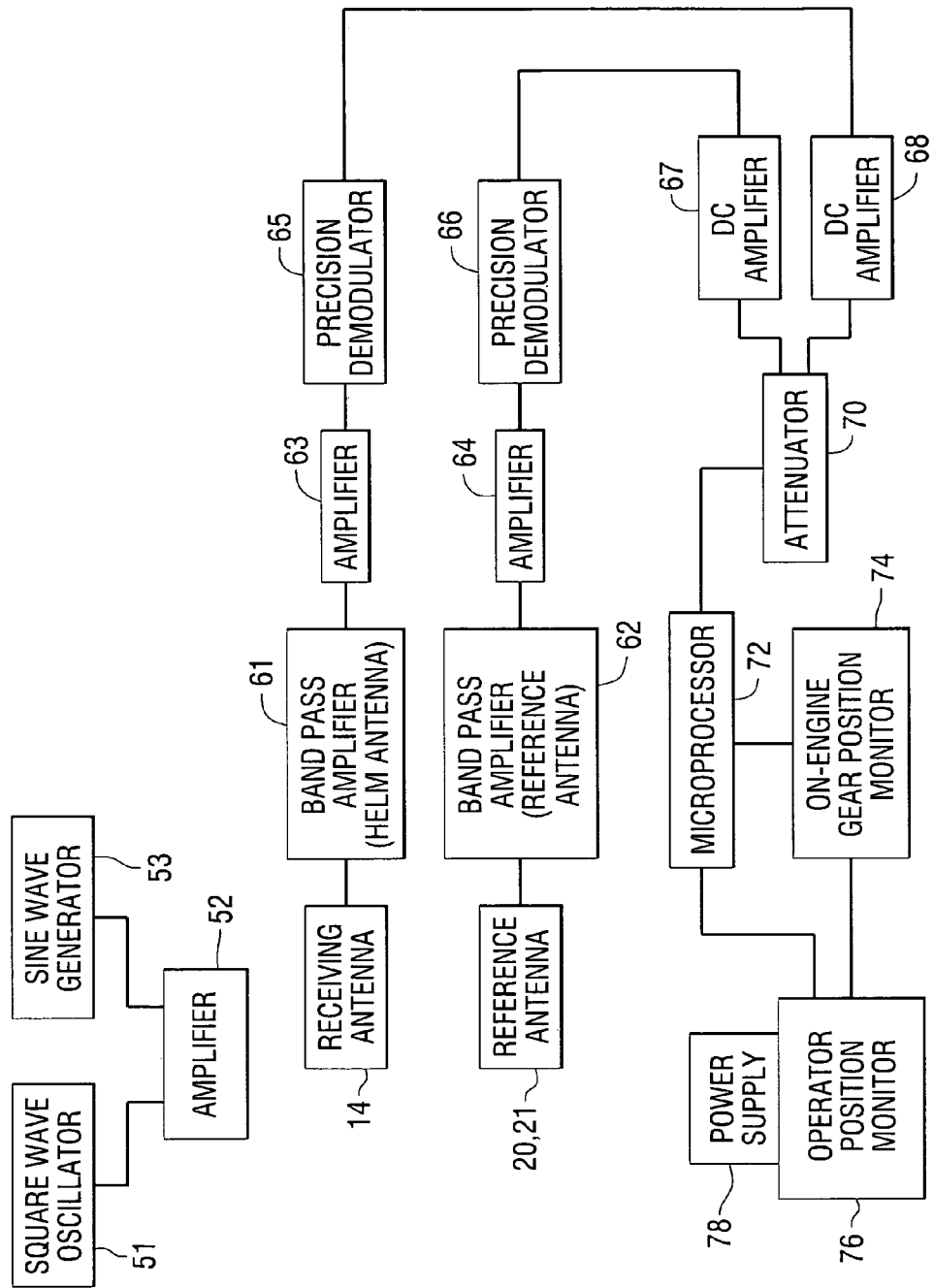

FIGS. 3 and 4 illustrate an exemplary circuit that can be used to transmit and receive the various signals used to implement the present invention. FIG. 3 is more detailed than FIG. 4 and illustrates the electrical components of the circuit which are also identified in Table I below. FIG. 4 illustrates a more general functional block illustration of the circuit shown in FIG. 3.

TABLE I

| Reference | Value or Type |
| --- | --- |
| R1 | 14.3 kΩ |
| R2 | 1 MΩ |
| R3 | 510 Ω |
| R4 | 10 kΩ |
| R5 | 510 Ω |
| R6 | 10 kΩ |
| R7 | 39 kΩ |
| R8 | 1 MΩ |
| R9 | 10 kΩ |
| R10 | 10 kΩ |
| R11 | 3.65 kΩ |
| R12 | 3.65 kΩ |
| R13 | 10 kΩ |
| R14 Helm Gain | 10 kΩ |
| R15 | 100 kΩ |
| R16 | 10 kΩ |
| R17 | 1 MΩ |
| R18 | 39 kΩ |
| R19 | 10 kΩ |
| P20 | 10 kΩ |
| P21 | 3.65 kΩ |
| P22 | 3.65 kΩ |
| R23 | 1 MΩ |
| R24 | 10 kΩ |
| R25 Ref Gain | 10 kΩ |
| P26 | 100 kΩ |
| P27 | 1 MΩ |
| P28 | 10 kΩ |
| P29 Ref Offset | 1 kΩ |
| R30 | 20 kΩ |
| R31 | 100 kΩ |
| R32 | 10 kΩ |
| R33 | 10 kΩ |
| R34 Helm offset | 1 kΩ |
| R35 | 20 kΩ |
| R36 | 100 kΩ |
| R37 | 10 kΩ |
| R38 | 10 kΩ |
| R39 | 100 kΩ |
| R40 | 330 kΩ |
| R41 | 100 kΩ |
| R42 | 10 kΩ |
| R43 | 100 kΩ |
| C1 | 0.001 μF |
| C2 | 0.047 μF |
| C3 | 0.001 μF |
| C5 | 0.001 pF |
| C6 | 0.001 pF |
| C7 | 0.001 μF |

TABLE I-continued

| Reference | Value or Type |
| --- | --- |
| C8 | 0.47 μF |
| C9 | 10 μF |
| C10 | 10 μF |
| C12 | 0.001 pF |
| C13 | 0.001 pF |
| C14 | 0.001 μF |
| C15 | 0.47 μF |
| C16 | 0.47 μF |
| C17 | 0.47 μF |
| C18 | 10 μF |
| U1 | LM2937 |
| U2 | LM78L05 |
| U3 | NOR gate |
| U4 | 12F675 |
| U5 | TL084AC |
| U6 | TL084AC |
| U7 | LMC6484 |
| U8 | LMC6482 |
| D1 | SD103A |
| D2 | SD103A |
| D6 | 1N5231 |
| Q1 | 2N7000 |
| Q2 | 2N7000 |

With reference to FIGS. 3 and 4, a transmitting circuit comprises the square wave oscillator 51, an amplifier 52, and a sine wave generator 53. The circuit associated with the receiving antenna system 14 and the reference antenna system, 20 and 21, comprises band pass amplifiers, 61 and 62, amplifiers, 63 and 64, and precision demodulators, 65 and 66. The receiving circuit associated with both the receiving and antenna system 14 and the reference antenna system, 20 and 21, further comprises DC amplifiers, 67 and 68, an attenuator 70, a microprocessor 72 and a gear position monitor which is associated with the engine and identified by reference numeral 74. In addition, a circuit portion 76, with a power supply 78, is provided to react to the presence or absence of a marine vessel operator at a preselected zone near the helm of a marine vessel.

It should be understood that the precise reaction to the absence of a marine operator at the helm position can vary in different embodiments of the present invention. For example, in some embodiments, it may be desirable to immediately turn off the engine of the marine vessel when it is detected that the marine operator is absent from the helm. In other embodiments, it maybe desirable to sound an alarm under these conditions. In yet other alternative embodiments of the present invention, it may be necessary to sound an alarm for a preselected period of time and then turn off the engine. In addition, certain embodiments of the present invention could turn off the engine when it is detected that, even though the operator is present at the helm, no movement of the operator has been detected for a preselected period of time.

Figure 5:
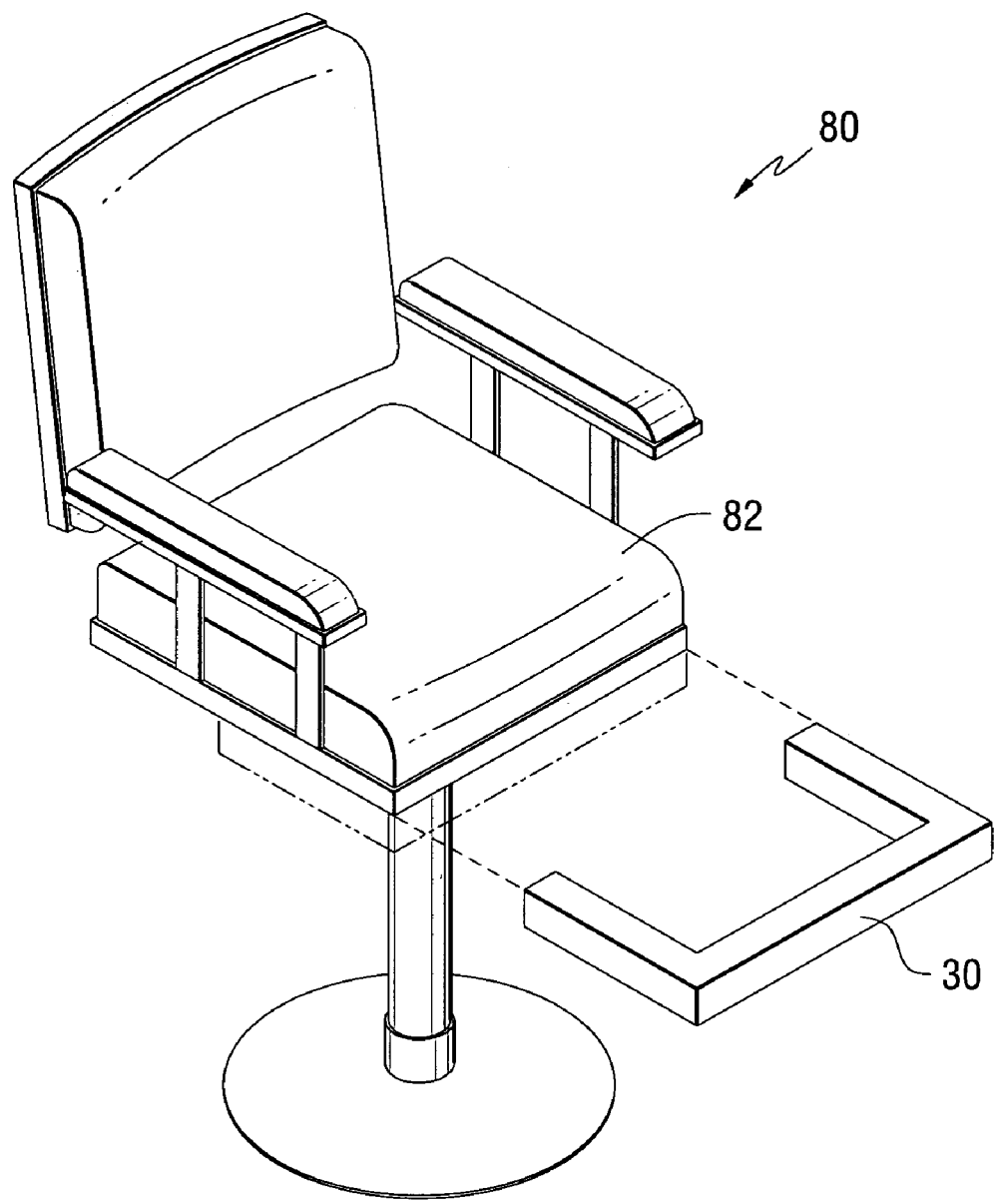
FIG. 5 shows a chair with a housing structure of the present invention.

FIG. 5 illustrates a chair 80 that is located at the helm of a marine vessel. The U-shaped structure of the housing 30 is configured to allow the present invention to be attached to the underside of the seat 82 of the chair 80. This is represented in the exploded view of FIG. 5. The location of the housing structure 30, relative to the chair 80, is beneficial because it provides a convenient location where the receiving antenna system 14 can detect the presence or absence of the marine vessel operator whether the operator is seated on the chair 80 or standing in front of it. It should be understood that it is common practice for a marine vessel operator to stand in front of the chair 80 and next to a steering wheel of the marine vessel. Since this can possibly be considered a legitimate position for the operator, the location of the present invention relative to the seat 82 allows it to detect this standing position and interpret it as being an acceptable position in addition to the normal seated position of the operator on the seat 82.

Figure 6:
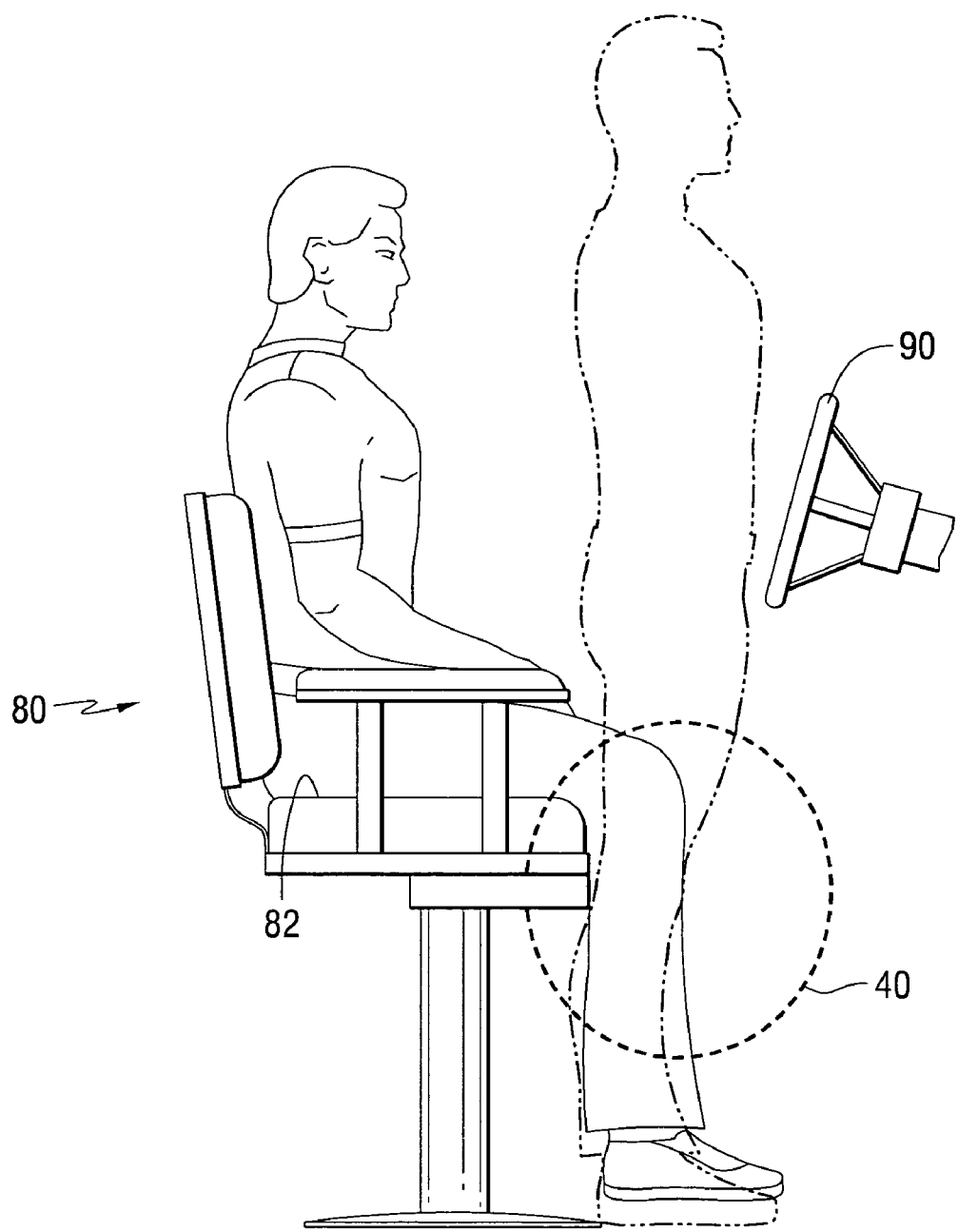
FIG. 6 shows the standing and seated positions of an operator at the helm position of a marine vessel in conjunction with the e-field detection zone of the present invention.

FIG. 6 illustrates a side view of the chair 80 with an operator of the marine vessel illustrated in both a seated position and a standing position (represented by phantom lines). The position of the steering wheel 90 is illustrated for reference with respect to the position of the chair 80. The electric field, or e-field 40, is represented by dashed lines in FIG. 6. It should be clearly understood that the specific shape of the e-field 40 is not limiting to the present invention. Depending on the size and shape of the various antenna components, the shape of the e-field 40 can vary from one application to another. In addition, it should be understood that the e-field is three dimensional and defines a detection zone within which the presence or absence of an object can be detected.

As can be seen in FIG. 6, the detection zone of the e-field 40 is positioned to respond to the presence or absence of the operator's thighs, knees, and calves. As the operator moves from a seated position to a standing position, or vice versa, the detected magnitude of the e-field 40 can change, but will generally remain within a range of magnitudes that can be interpreted as representing the presence of the marine vessel operator. If, on the other hand, the marine vessel operator leaves the helm station and moves out of the detection zone of the e-field 40, that absence of the operator can be quickly and accurately detected by the present invention.

Figure 7:
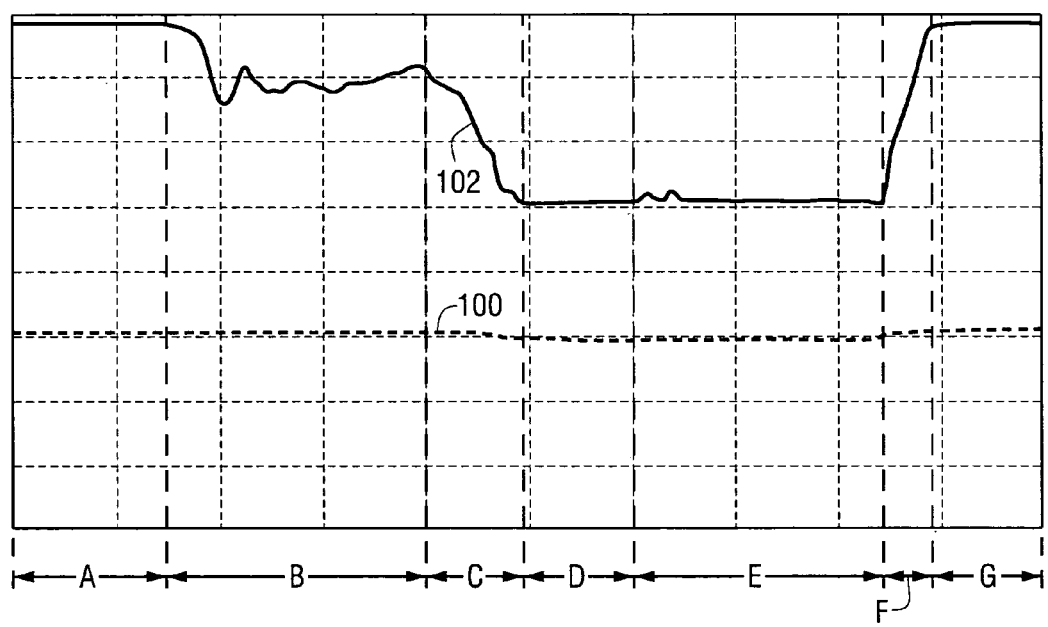
FIG. 7 is a time based signal graph showing the detected effects caused by the presence and/or absence of a marine vessel at a preselected helm position.

FIG. 7 illustrates an exemplary oscilloscope trace of the signal strengths of both the reference antenna system 100 and the receiving antenna system 102. In other words, line 102 represents the voltage signal corresponding to the strength of the e-field 40 received by the receiving antenna 14 and dashed line 100 represents the signal strength of the e-field received by the reference antenna system, 20 and 21. In FIG. 7, the timeline of the graphical representation is divided into seven zones A-G.

During the time period represented by Zone A, no marine operator is present in the region between the chair 80 and the steering wheel 90. In other words, no portion of the marine vessel operator's body is present in the e-field 40 detection zone.

Time Zone B in FIG. 7 represents the condition when an operator is standing between the chair 80 and the steering wheel 90, but with only one foot between the chair and the steering wheel. In other words, the operator is standing partially between the chair 80 and the steering wheel 90 and partially out of that defined position. However, comparing the magnitude of line 102 in Zones A and B, it can be seen that the signal strength of the e-field 40 received by the receiving antenna system 14 is sufficiently decreased to detect the presence of the operator 1 within the acceptable zone where the operator can control the steering wheel 90 and related control devices for the marine vessel.

With continued reference to FIG. 7, Zone C represents a condition where the operator is in the process of sitting down on the seat 82 of the chair 80. This position of the marine vessel operator, with increased portions of both legs within the detection zone of the e-field 40, decreases the magnitude of the signal significantly, as represented by the decrease in value illustrated by line 102.

Zone D in FIG. 7 represents an operator seated on the seat 82 of the chair 80 and remaining motionless. As can be seen, no deviation in the horizontal characteristic of line 102 occurs in Zone D. If desired, this characteristic signal of a motionless operator could be used to detect whether or not the operator may be unconscious even though at the helm position. One alternative embodiment of the present invention could periodically examine the signal 102 to determine if movement occurs over a period of time. If no such movement is detected, an alarm can be sounded and the engine of the marine vessel can be stopped.

Zone E in FIG. 7 represents a seated operator, but with slight leg movement. The minor deviations in the magnitude of line 102 within Zone E show the effect of this slight leg movement.

During Zone F, in FIG. 7, the operator rises from the seat 82 of chair 80 and leaves the helm position. Line 102 shows the increase in magnitude of the e-field 40 during that maneuver. This change in magnitude allows the present invention to quickly and accurately detect the absence of the marine vessel operator. Zone G in FIG. 7, similar to Zone A, represents the absence of an operator from the helm position.

With reference to FIGS. 1-7, it can be seen that a method for detecting an occupant in a preselected position at a control position of a marine vessel, according to a preferred embodiment of the present invention, comprises the steps of providing a transmitting antenna system, 10 and 11, and a receiving antenna system 14. It also comprises the steps of supporting the transmitting and receiving antenna systems at a location proximate a helm of a marine vessel. It comprises the step of causing an electric field 40 to be emitted by the transmitting antenna system, 10 and 11, and received by the receiving antenna system 14. The electric field 40 extends in a preselected region where a portion of a body of a marine vessel operator is located during safe and acceptable operation of the marine vessel. The present invention receives a first signal which represents the electric field 40 by the receiving antenna system 14. The first signal is compared to a threshold magnitude, as represented by the various changes in magnitude illustrated in FIG. 7. The present invention further provides a reference antenna system, 20 and 21, which is used in a self-calibrating procedure to respond to changes in the environment surrounding the present invention.

The reference signal 100 illustrated in FIG. 7 allows the present invention to respond to changing atmospheric and environmental conditions. For example, if dampness exists on the housing structure 30, the resulting signal received by the reference antenna system, 20 and 21, will be decreased. That measured decrease allows the present invention to mathematically alter the received signal from the receiving antenna system 14 in order to compensate for the environmentally-caused change in the effective e-field strength. This self-calibrating characteristic is based on the assumption that any change made to the reference e-field received by the reference antenna system, 20 and 21, will be generally similar to the effect on the received signal associated with the e-field received by the receiving antenna system. In addition, the location of the various antenna systems of the present invention and its supporting structure 30 allow the effective detection of a marine vessel operator at the helm position in both the seated and standing positions. In addition, since many types of marine vessels do not have a roof structure suitable for mounting antennae, the location of the present invention under the seat is particularly convenient and effective in virtually all marine vessel circumstances. By providing the reference antenna system, 20 and 21, and the configuration which is easily attachable to a chair of a marine vessel, the present invention provides a method for determining the presence or absence of a marine vessel operator at the helm station in a particularly convenient way. In addition, the system of the present invention allows existing marine vessels to be retrofitted to incorporate the advantages of the present invention.

With reference to FIGS. 1-4, it can be seen that the transmitting antenna system, 10 and 11, are connected together. In addition, the reference antenna system, 20 and 21, are connected together. A preferred embodiment of the present invention uses a single receiving antenna system 14. It should be understood that these selections are optional in various embodiments of the present invention. The symmetrical structure of the U-shaped housing 30 was selected to facilitate the symmetry of the e-field 40. As such, the symmetrical structure further facilitated the use of two reference antennae and two transmitting antennae as described above. With reference to FIG. 7, it should also be understood that the conditions illustrated in Zones A and G would typically prompt the microprocessor of the present invention to react to the absence of the operator in the helm zone and, as a result, turn off the engine of the marine vessel or, at least, sound an alarm to draw attention to the fact that the operator is not in a proper position to operate the marine vessel.

From the above discussion, it can be seen that the present invention provides an effective system that detects the presence and absence of an operator at the marine vessel helm position without requiring direct contact of a monitoring device to the operator. In addition, the present invention does not require the operator to wear an attached sensing or transmitting component in order to be detected within the zone.

Although the present invention has been described with particular specificity and illustrated to show a preferred embodiment, it should be understood that alternative embodiments are also within its scope.

I claim:

1. A method for detecting an occupant in a preselected position at a control position of a marine vessel, comprising the steps of:
   providing a transmitting antenna system;
   providing a receiving antenna system;
   supporting said transmitting and receiving antenna systems within a housing structure at a location proximate a helm of said marine vessel and attached to a seat of a chair which is located at said helm of said marine vessel;
   causing an electric field to be emitted by said transmitting antenna system and received by said receiving antenna system, said electric field extending in a preselected region where a portion of a body of a marine vessel operator is located during safe operation of said marine vessel by said marine vessel operator;
   receiving a first signal which represents said electric field received by said from said receiving antenna system;
   comparing said first signal to a threshold magnitude, said comparing step comprising a plurality of sequential comparisons performed at a preselected frequency; and
   determining whether said marine vessel operator is present within said preselected region of said marine vessel as a function of said first signal and said threshold magnitude.

2. The method of claim 1, further comprising:
   providing a reference antenna system; and
   receiving a reference signal which represents said electric field received by said from said reference antenna system, wherein said determining step determines whether said marine vessel operator is present within said preselected region of said marine vessel as a function of said first signal, said reference signal and said threshold magnitude.

3. The method of claim 1, wherein:
   said reference antenna system comprises first and second reference antennae.

4. The method of claim 2, further comprising:
   mathematically altering said first signal as a function of said reference signal.

5. The method of claim 1, wherein:
   said transmitting antenna system comprises first and second transmitting antennae.

6. The method of claim 1, wherein:
   said determining step comprises a plurality of sequential determinations performed at said preselected frequency, a determination that said marine vessel operator is absent from said preselected region of said marine vessel being made when a predetermined number of said plurality of sequential determinations indicate that said marine vessel operator is not present within said preselected region of said marine vessel.

7. The method of claim 1, wherein:
   said determining step comprises a step of detecting a lack of change in a magnitude of said first signal over a preselected period of time.

8. The method of claim 1, wherein:
   said preselected region includes a portion of the body of said marine vessel operator both when said marine vessel operator is seated at said helm and when said marine vessel operator is standing at said helm.

9. A method for detecting an occupant in a preselected position at a control position of a marine vessel, comprising the steps of:
   providing a transmitting antenna system;
   providing a receiving antenna system;
   supporting said transmitting and receiving antenna systems at a location proximate a helm of said marine vessel;
   causing an electric field to be emitted by said transmitting antenna system and received by said receiving antenna system, said electric field extending in a preselected region where a portion of a body of a marine vessel operator is located during safe operation of said marine vessel by said marine vessel operator;
   receiving a first signal which represents an effective strength of said electric field received by said from said receiving antenna system;
   comparing said first signal to a threshold magnitude;
   providing a reference antenna system;
   receiving a reference signal which represents said electric field received by said from said reference antenna system; and
   determining whether said marine vessel operator is present within said preselected region of said marine vessel, wherein said determining step determines whether said marine vessel operator is present within said preselected region of said marine vessel as a function of said first signal, said reference signal and said threshold magnitude.

10. The method of claim 9, wherein:
    said reference antenna system comprises first and second reference antennae; and
    said transmitting antenna system comprises first and second transmitting antennae.

11. The method of claim 10, further comprising:
    mathematically altering said first signal as a function of said reference signal.

12. The method of claim 11, wherein:
said transmitting and receiving antenna systems are disposed for support within a housing structure, said housing structure being attached to a seat of a chair which is located at said helm of said marine vessel.

13. The method of claim 12, wherein:
said comparing step comprises a plurality of sequential comparisons performed at a preselected frequency.

14. The method of claim 13, wherein:
said determining step comprises a plurality of sequential determinations performed at said preselected frequency, a determination that said marine vessel operator is absent from said preselected region of said marine vessel being made when a predetermined number of said plurality of sequential determinations indicate that said marine vessel operator is not present within said preselected region of said marine vessel.

15. The method of claim 14, wherein:
said determining step comprises a step of detecting a lack of change in a magnitude of said first signal over a preselected period of time.

16. The method of claim 9, wherein:
said preselected region includes a portion of the body of said marine vessel operator both when said marine vessel operator is seated at said helm and when said marine vessel operator is standing at said helm.

17. The method of claim 16, wherein:
said portion of the body comprises a leg of said marine vessel operator.

18. A method for detecting an occupant in a preselected position at a control position of a marine vessel, comprising the steps of:
providing a transmitting antenna system;
providing a receiving antenna system, said receiving antenna system comprising first and second receiving antennae;
supporting said transmitting and receiving antenna systems at a location proximate a helm of said marine vessel;
causing an electric field to be emitted by said transmitting antenna system and received by said receiving antenna system, said electric field extending in a preselected region where a portion of a body of a marine vessel operator is located during safe operation of said marine vessel by said marine vessel operator;
receiving a first signal which represents said electric field received by said from said receiving antenna system;
comparing said first signal to a threshold magnitude; and
determining whether said marine vessel operator is present within said preselected region of said marine vessel as a function of said first signal and said threshold magnitude, said transmitting and receiving antenna systems being disposed for support within a housing structure, said comparing step comprising a plurality of sequential comparisons performed at a preselected frequency, said determining step comprising a plurality of sequential determinations performed at said preselected frequency, a determination that said marine vessel operator is absent from said preselected region of said marine vessel being made when a predetermined number of said plurality of sequential determinations indicate that said marine vessel operator is not present within said preselected region of said marine vessel, said preselected region including a portion of the body of said marine vessel operator both when said marine vessel operator is seated at said helm and when said marine vessel operator is standing at said helm.

19. The method of claim 18, further comprising:
providing a reference antenna system;
receiving a reference signal which represents said electric field received by said from said reference antenna system, wherein said determining step determines whether said marine vessel operator is present within said preselected region of said marine vessel as a function of said first signal, said reference signal and said threshold magnitude, said reference antenna system comprising first and second reference antennae; and
mathematically altering said first signal as a function of said reference signal, said housing structure being attached beneath a seat of a chair which is located at said helm of said marine vessel, said determining step comprising a step of detecting a lack of change in a magnitude of said first signal over a preselected period of time.

* * * * *